United States Patent [19]

Karino et al.

[11] Patent Number: 5,760,372
[45] Date of Patent: Jun. 2, 1998

[54] ARC WELDER

[75] Inventors: Kunio Karino, Suita; Haruo Moriguchi, Itami; Shigeru Okamoto, Hirakata; Kenzo Danjo, Soraku-gun; Atushi Kinoshita, Osaka; Toshikazu Fujiyoshi, Kawanishi, all of Japan

[73] Assignee: Sansha Electric Manufacturing Company, Limited, Osaka, Japan

[21] Appl. No.: 669,993

[22] Filed: Jun. 21, 1996

[30] Foreign Application Priority Data

Jun. 23, 1995 [JP] Japan .................. 7-181007

[51] Int. Cl.$^6$ .......................... B23K 9/06
[52] U.S. Cl. ............................ 219/130.4
[58] Field of Search ............. 219/130.1, 130.4, 219/130.51, 137 PS, 130.31, 130.32, 130.33

[56] References Cited

U.S. PATENT DOCUMENTS

| | | | |
|---|---|---|---|
| 3,459,996 | 8/1969 | Adamson et al. | 219/130.32 |
| 4,117,303 | 9/1978 | Hedberg | 219/130.1 |
| 4,876,433 | 10/1989 | Kashima et al. | 219/130.51 |
| 5,306,894 | 4/1994 | Moriguchi et al. | 219/130.31 |
| 5,319,533 | 6/1994 | Reynolds et al. | 363/17 |

FOREIGN PATENT DOCUMENTS

| | | |
|---|---|---|
| 0 538 227 A1 | 4/1993 | European Pat. Off. |
| 0 608 536 A1 | 8/1994 | European Pat. Off. |
| HEI 3-31499 | 11/1984 | Japan |
| 63-25013 | 7/1988 | Japan |
| 1 541 068 | 2/1979 | United Kingdom |
| 1 601 589 | 4/1981 | United Kingdom |

Primary Examiner—Clifford C. Shaw
Attorney, Agent, or Firm—Duane, Morris & Heckscher LLP

[57] ABSTRACT

An arc welder includes an inverter for converting a DC voltage to a RF voltage which, then, is rectified by a rectifier. The output of the rectifier is smoothed by a DC reactor. A RF generator provides RF current to flow between a workpiece and a main electrode of the welder forming a welder load, which initiates arcing between the workpiece and the main electrode. Initiation of arcing causes output current from the DC reactor to be supplied to the welder load, so that steady-state arcing is established. The DC reactor has a relatively small inductance which permit the output current from the DC reactor to reach a value required for establishing the steady-state arcing within a time period during which the RF generator provides RF current. The RF voltage from the inverter has a relatively high frequency so that the output current from the DC reactor can sustain the steady-state arcing.

4 Claims, 4 Drawing Sheets

ARC WELDER

The present invention relates to welding machines, such as a non-consumable electrode arc welder, e.g. a TIG (tungsten-inert gas) welder, and a consumable electrode arc welder, e.g. a carbon dioxide gas welder.

BACKGROUND OF THE INVENTION

Usually, in a TIG welder, for initiating arcing between a workpiece and a main electrode of the welder, RF current is applied to flow momentarily between the workpiece and the main electrode. On the other hand, arc is initiated in consumable electrode arc welders by bringing a main electrode to contact with a workpiece.

Many recent arc welders use an inverter, which enables reduction in size and weight of the welders.

An example of prior art DC TIG welders is shown in FIG. 1. An AC voltage supplied at input terminals 1 is rectified in a rectifier 2, and the rectified voltage from the rectifier 2 is smoothed by a smoothing capacitor 3 into a DC voltage. The DC voltage is applied to an inverter 4 which includes a plurality of switching elements, such as IGBT's (insulated gate bipolar transistors) and bipolar transistors. The switching elements are controlled, e.g. PWM controlled, by a control circuit (not shown), so that the DC voltage applied to the inverter 4 is converted to an AC voltage, e.g. a RF pulse voltage, having a frequency of about 10 KHz.

The RF pulse voltage from the inverter 4 is applied to a primary winding 5a of a transformer 5 which further includes a secondary winding 5b and a tertiary winding 5c. The application of the RF pulse voltage across the primary winding 5a induces a RF pulse voltage across the secondary winding 5b, which voltage is, then, rectified and smoothed by a rectifier 6 and smoothing means, such as a DC reactor 7, respectively, so that the RF pulse voltage is converted to a DC voltage. The DC voltage is, then, applied to a welder load 8, namely, between a workpiece 9 and a main electrode 10 of the welder which are spaced by a small gap from each other.

A first path connects one output of the rectifier 6 to the workpiece 9, and a second path connected the other output of the rectifier 6 to the main electrode 10. A DC reactor 7 is connected in the first path between the rectifier 6 and the workpiece 9, and RF current supply means, such as a RF generator 12, is coupled in the second path between the rectifier 6 and the main electrode 10 via a coupling coil 11. When the RF generator 12 is activated, a RF current is applied momentarily between the workpiece 9 and the main electrode 10 with the gap interposed therebetween. A capacitor 13 is connected between the junction of the DC reactor 7 and the workpiece 9 and the junction of the rectifier 6 and the coupling coil 11. The capacitor 13 is a bypass capacitor for preventing the RF current from being supplied to the rectifier 6 and the DC reactor 7.

A RF pulse voltage induced across the tertiary winding 5c by the application of the RF pulse voltage across the primary winding 5a is rectified by a rectifier 14, and the rectified voltage from the rectifier 14 is applied across the DC reactor 7 via a current limiting resistor 15. In other words, the rectified RF pulse voltage is superposed on the rectifier output from the rectifier 6 connected to the secondary winding 5b. The tertiary winding 5c, the rectifier 14 and the current limiting resistor 15 form a steady-state arcing establishing circuit 16. The steady-state arcing establishing circuit 16 is a circuit for establishing a steady-state arcing between the workpiece 9 and the main electrode 10 by coupling current from the rectifier 14 to the workpiece 9 and the main electrode 10 only upon the initiation of arcing in the DC TIG welder, and includes a switch SW which is closed only when arcing is to be initiated.

A series combination of a resistor 17 and a capacitor 18 is connected between the first and second paths which connect the rectifier 6 to the workpiece 9 and to the main electrode 10, respectively. The series circuit is a surge absorbing circuit for preventing the generation of surge current when current is supplied through the steady-state arcing establishing circuit 16.

For operating the above-described DC TIG welder, first the RF generator 12 is operated, which causes RF current shown, for example, in FIG. 2(a), to flow between the workpiece 9 and the main electrode 10 for a time period t. This initiates arcing between the workpiece 9 and the main electrode 10. The initiation of arcing causes DC current to flow from the DC reactor 7 through the gap between the workpiece 9 and the main electrode 10. Thus, the transition from the initial arcing state to a steady arcing state occurs.

In order to stabilize the steady-state arcing, DC current smoothed sufficiently by the DC reactor 7 must be supplied between the workpiece 9 and the main electrode 10. If the RF current is insufficiently smoothed, the steady-state arcing cannot be stable, which may cause discontinuance in arcing. As described above, the frequency of the RF pulse voltage is about 10 KHz, and the inverter 4 is PWM controlled. Thus, a time interval (pulse interval) from a time when the RF pulse voltage falls to a time when the voltage next rises is relatively long. If the PWM control is such that it suppresses the current to the welder load 8 as much as possible, the width of each pulse of the RF pulse voltage becomes smaller and, accordingly, the pulse interval becomes longer. It is difficult to sufficiently smooth such a short-pulse-width RF pulse voltage. Accordingly, in order for the RF pulse voltage from the inverter 4 to be smoothed sufficiently, the DC reactor 7 has a relatively large inductance of, for example, from 50 to 300 µH.

In order to provide a smooth transition from the initial arcing state to the steady arcing state, the DC current from the DC reactor 7 must attain a value $I_O$ (FIG. 2(b)) within the time period t during which the RF current is applied between the workpiece 9 and the main electrode 10. The value $I_O$ is a value required for the steady-state arcing to be established or sustained. However, the DC current has a low rising rate at its starting portion due to the inductance of the DC reactor. In particular, because of the large inductance of the DC reactor 7, the delay in increase of the DC current is significant. Therefore, the DC current may not reach the value $I_O$ for the stable steady-state arcing within the time period t during which the RF current is applied. This impedes smooth transition to the steady-state arcing.

The steady-state arcing establishing circuit 16 is used to eliminate this problem. When the RF generator 12 is enabled, the switch SW is simultaneously turned on, and current greater than $I_O$ required for the steady-state arcing is supplied from the steady-state arcing establishing circuit 16 to the workpiece 9 and the main electrode 10. (This current does not flow through the DC reactor 7.) Thus, current above $I_O$ is supplied to the load 8 including the workpiece 9 and the main electrode 10 within the time period t during which the RF current is supplied to the welder load 8, so that the steady-state arcing is established. In this way, the delay in increase of the DC current caused by the large inductance of the DC reactor 7 can be compensated for. After the steady-state in arcing is established, the switch SW is turned off so that the current supply for the steady-state arcing establishing circuit 16 is cut off.

Because the above-described prior art arc welding machine includes the steady-state arcing establishing circuit 16, it is large in size, complex in structure and high in cost. Accordingly, in the arc welding machines which employ the inverter 4 for the purpose of reducing the size and weight of the welding machines, the advantages provided by the use of the inverter 4 are all cancelled.

Techniques similar to the one described above, for providing smooth transition from the initial arcing to the steady-state arcing are disclosed in Japanese Examined UM Publication No. SHO 63-25013published on Jul. 8, 1988 and Japanese Examined UM Publication No. HEI 3-31499 published on Jul. 4, 1991. The welding machine shown in the former publication requires means for short-circuiting a DC reactor, and the welder shown in the latter requires a steady-state arcing establishing circuit, both of which are not used during welding operation of the welders.

An object of the present invention is to provide an arc welder in which transition from an initial arcing state to a steady arcing state is reliably performed and in which the steady-state arcing is stabilized, without need for any additional circuits which are not used during welding operation.

SUMMARY OF THE INVENTION

According to the present invention, an arc welder includes an inverter for converting a DC voltage into an AC voltage. The AC output of the inverter is rectified by a rectifier. The rectified voltage from the rectifier is smoothed by smoothing means which is coupled to a welder load including a workpiece and a welder main electrode. RF current supply means is used to supply RF current to flow between the workpiece and the main electrode. The application of the RF current from the RF current supply means causes arcing to be initiated between the workpiece and the main electrode. The initiation of arcing causes DC current to be supplied from the smoothing means to the welder load, which establishes steady-state arcing between the workpiece and the main electrode.

The smoothing means may be provided by a DC reactor having a relatively small inductance which is sufficient to make the DC current from the smoothing means to attain a value required for establishing the steady-state in arcing within a time period during which RF current is supplied to the welder load. The frequency of the RF voltage from the inverter is relatively high so that the steady-state arcing can be established by the DC current from the smoothing means.

According to another embodiment of the present invention, an arc welder includes an inverter for converting a DC voltage into an AC voltage. The AC output of the inverter is rectified by a rectifier. The rectified voltage from the rectifier is smoothed by smoothing means and is coupled to a welder load including a workpiece and a welder main electrode. The workpiece and the main electrode are brought into contact with each other to cause arcing to be initiated between them. The initiation of arcing causes DC current to be supplied from the smoothing means to the welder load, which establishes steady-state arcing between the workpiece and the main electrode.

The smoothing means may be a DC reactor having a relatively small inductance which is sufficient to make the DC current from the smoothing means to attain a value required for establishing the steady-state in arcing within a time period during which the workpiece and the main electrode are in contact with each other. The frequency of the RF voltage from the inverter is relatively high so that the steady-state arcing can be established by the DC current from the smoothing means.

The arc welder may further include a low frequency inverter connected between the DC reactor and the welder load. The low frequency inverter converts the output voltage of the DC reactor to a low frequency AC voltage.

The inductance of the DC reactor may be from 3 to 20 μH.

The frequency of the AC voltage from the inverter may be from 16 to 100 KHz.

DESCRIPTION OF PREFERRED EMBODIMENTS

First, the present invention embodied in, for example, a DC TIG welder is described with reference to FIGS. 2(b) and 3.

Figure 1:
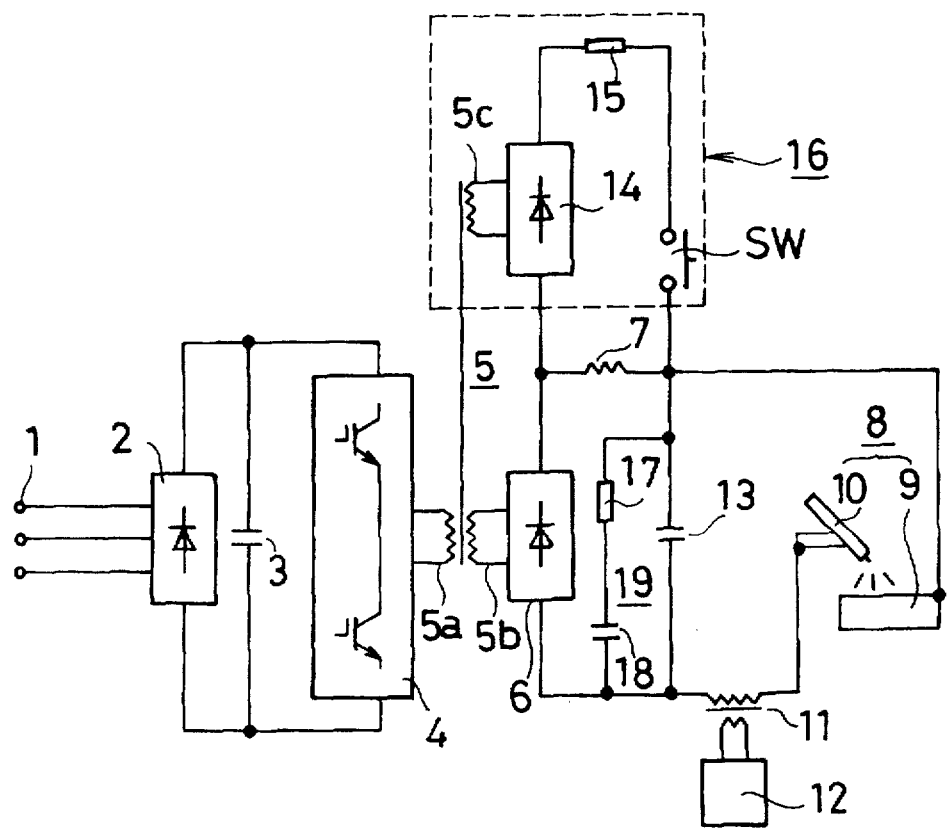
FIG. 1 is a block diagram of a prior art DC TIG welder.
Figure 3:
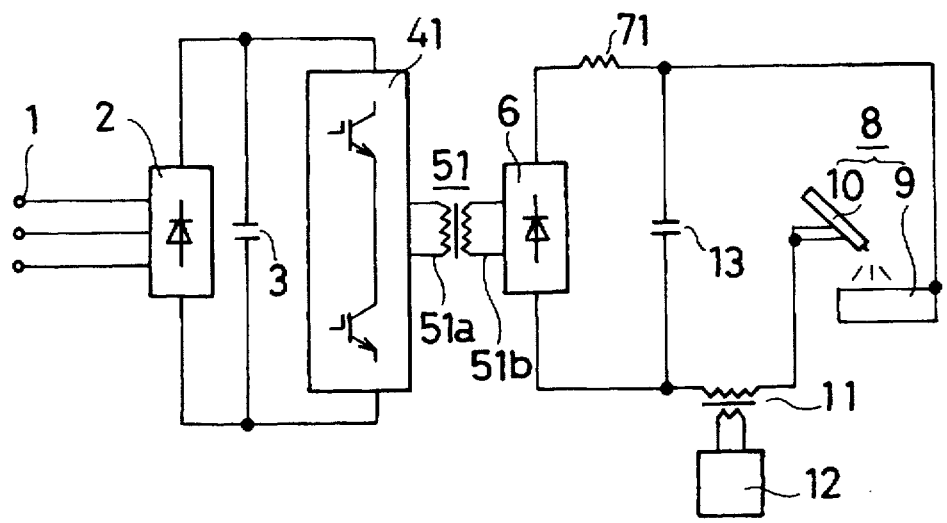
FIG. 3 is a block diagram of a DC TIG welder according to a first embodiment of the present invention.

The DC TIG welder is identical with the prior art DC TIG welder shown in FIG. 1, except that the welder of the present invention shown in FIG. 3 does not include the steady-state arcing establishing circuit 16 and the associated surge absorbing circuit 19. Also, in place of the inverter 4, the transformer 5 and the DC reactor 7 of the welder of FIG. 1, an inverter 41, a transformer 51 and a DC reactor 71 are used.

The transformer 51 includes a primary winding 51a and a secondary winding 51b. This transformer 51 includes no tertiary winding.

The DC reactor 71 has a smaller inductance than the reactor 7 of the prior art welder. For instance, the reactor 71 has an inductance of from 3 to 20 μH, preferably, 20 μH.

The inverter 41 is controlled, e.g. PWM controlled, by a control circuit (not shown) in such a manner that the frequency of a RF voltage developed by the inverter 41 has a frequency of, for example, from 16 to 100 KHz, preferably, 16 KHz, which is higher than the frequency of the RF voltage produced by the inverter 4 of the prior art welder shown in FIG. 1.

The remainder of the welder shown in FIG. 3 is similar to the welder of FIG. 1, and, therefore, the same reference numerals as used in FIG. 1 are attached to similar components and no further description is made.

Referring to FIG. 3, let it be assumed that the RF generator 12 is in the disabled state and that the gap between the workpiece 9 and the main electrode 10 is small.

An AC voltage supplied through the input terminals 1 is rectified and smoothed by the rectifier 2 and the smoothing capacitor 3 into a DC voltage. The DC voltage is applied to the inverter 41, which converts the applied DC voltage to a first RF pulse voltage. The first RF pulse voltage is then applied to the primary winding 51a of the transformer 51, so that a second RF pulse voltage is induced in the secondary winding 51b. The second RF pulse voltage is then rectified by the rectifier 6, of which the output voltage is smoothed by the DC reactor 71 for application between the workpiece 9 and the main electrode 10. Due to the gap between the workpiece 9 and the main electrode 10, no current flows through the DC reactor 71, the workpiece 9 and the main electrode 10.

Figure 2A:
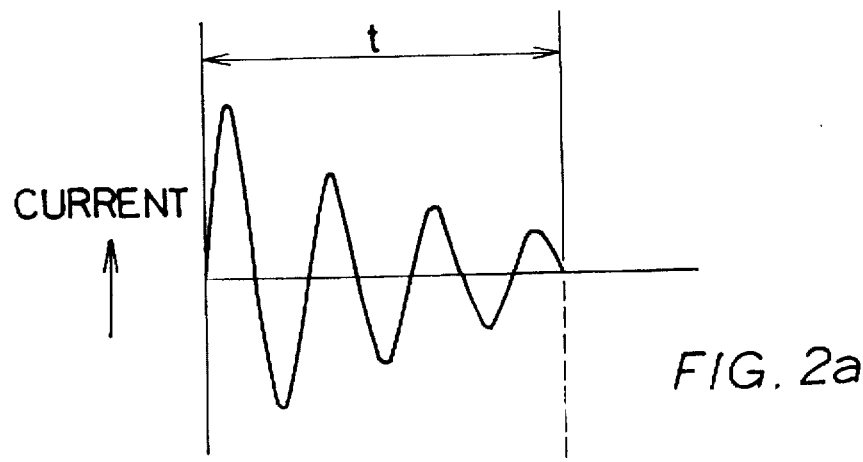
FIG. 2(a) shows RF current provided by a RF generator to a welder load when arcing is initiated in the DC TIG welder of FIG. 1 or in a DC TIG welder of the present invention.
Figure 2B:
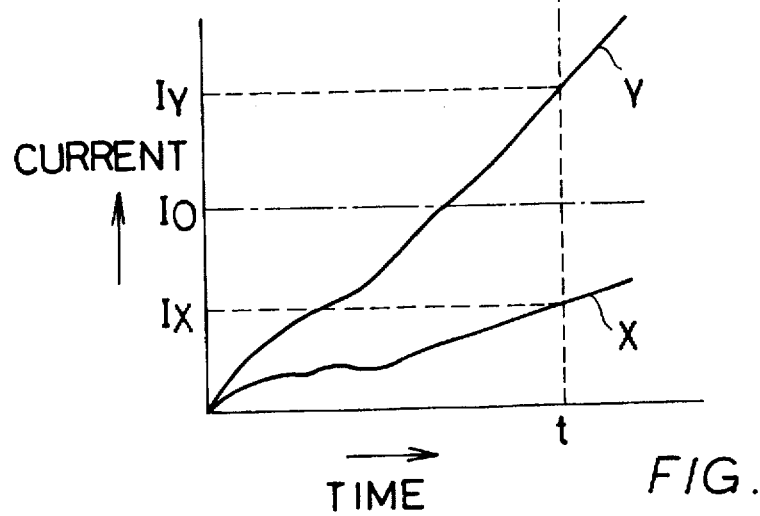
FIG. 2(b) shows DC currents Ix and Iy supplied from a DC reactor to the welder load when arcing is initiated, in the prior art DC TIG welder and the DC TIG welder of the present invention, respectively.

Then, the RF generator 12 is enabled to supply RF current like the one shown in FIG. 2(a) to flow between the workpiece 9 and the main electrode 10 for a short time period t, e.g. for 5 µs. The application of the RF current causes arcing to be initiated between the workpiece 9 and the main electrode 10.

Initiation of arcing causes DC current to flow from the DC reactor through the workpiece 9 and the main electrode 10. The inductance of the DC reactor 71 lowers the rate of initial increase of the DC current from the DC reactor 71. However, since the inductance of the DC reactor 71 is 20 µH which is small relative to the value of the DC reactor 7 of the prior art welder, the reduction in initial increasing rate of the DC current is smaller. Thus, as shown in FIG. 2(b), the DC current from the DC reactor 71 indicated by a curve Y increases faster than the DC current indicated by a curve X in the prior art welder of FIG. 1. Accordingly, the DC current can increase to a value $I_Y$, e.g. 5A, which is sufficiently larger than the current $I_O$, e.g. 1A, required for establishing and sustaining the steady-state arcing, within the time period during which the RF current is supplied from the RF generator 12, i.e. during the arc initiating time period t.

Since the current $I_Y$, which is sufficiently larger than the current value $I_O$ required for establishing the steady-state arcing flows between the workpiece 9 and the main electrode 10 within the time period t during which the RF current is flowing therebetween, the steady-state arcing can be established without fail. Thus, transition from the initial arcing state to the steady state can be achieved smoothly.

Once the steady state is established, the steady state in arcing is sustained by the DC current from the DC reactor 71. In order for the steady-state arcing to be sustained, the DC current to be supplied between the workpiece 9 and the main electrode 10 must be smoothed sufficiently by the DC reactor 71.

The frequency of the first RF pulse voltage from the inverter 41 is 16 KHz, which is higher than that of the RF pulse voltage used in the prior art welder shown in FIG. 1, the interval from the time when a pulse of the RF pulse voltage falls to the time when the next pulse rises is shorter than in the prior art welder shown in FIG. 1. Accordingly, although the inductance of the DC reactor 71 is 20 µH, which is smaller than that of the DC rector of the prior art welder, the DC reactor 71 can smooth sufficiently the first RF pulse voltage of 16 KHz. Thus, the steady state in arcing can be adequately sustained.

According to the present invention, the DC reactor 71 has a smaller inductance than DC reactors used in prior art welders, and the RF pulse voltage from the inverter 41 has a higher frequency than RF pulse voltages in prior art welders. This provides reliable transition from the initial arcing state to the steady arcing state and also stabilizes the steady-state arcing, without need for using any circuits like the steady-state arcing establishing circuit 16 as used in the prior art welder shown in FIG. 1. Because the welder of FIG. 3 does not include circuits which are not used during the welding operation, like the steady-state arcing establishing circuit 16, reduction of size and cost and simplification of construction can be realized. In particular, in arc welders which use an inverter for the purpose of attaining advantages by reducing the size and weight, such advantages can be fully attained.

In the illustrated embodiment, the DC reactor 71 is described to have an inductance of 20 µH, but the inductance may have any value within a range of from 3 to 20 µH. Also, although the RF pulse voltage developed by the inverter 41 is described to have a frequency of 16 KHz, it can be any frequency within a range of from 16 to 100 KHz. The inventors have found that substantially the same results as described above can be obtained even if the inductance of the DC reactor 71 and the frequency of the RF pulse voltage are varied within the above-described ranges.

The present invention has been described by means of a DC TIG welder, but it can be embodied in other non-consumable electrode arc welders.

Figure 4:
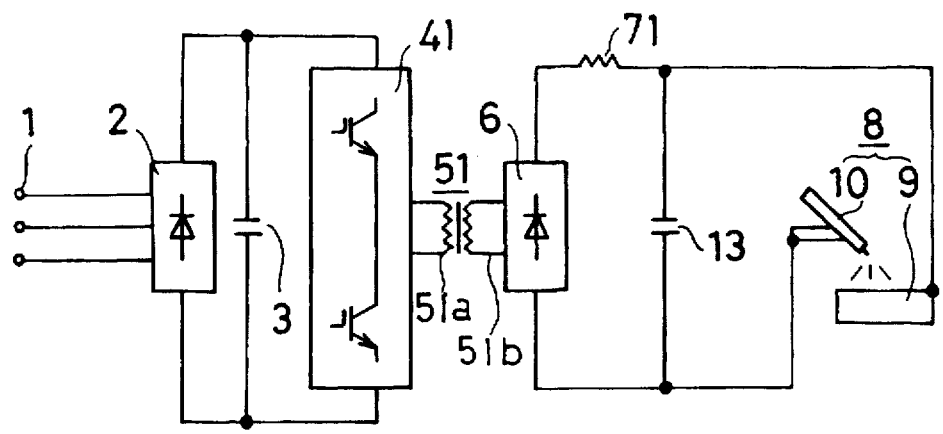
FIG. 4 is a block diagram of a consumable electrode arc welder according to another embodiment of the present invention.

Also, it can be applicable to consumable electrode arc welders, such as a carbon dioxide welder like the one shown in FIG. 4. When the present invention is embodied in the carbon dioxide welder, the coupling coil 11 and the RF generator 12 used in the welder shown in FIG. 3 are removed. The arcing is initiated by bringing the workpiece 9 and the main electrode 10 into contact with each other.

Figure 5:
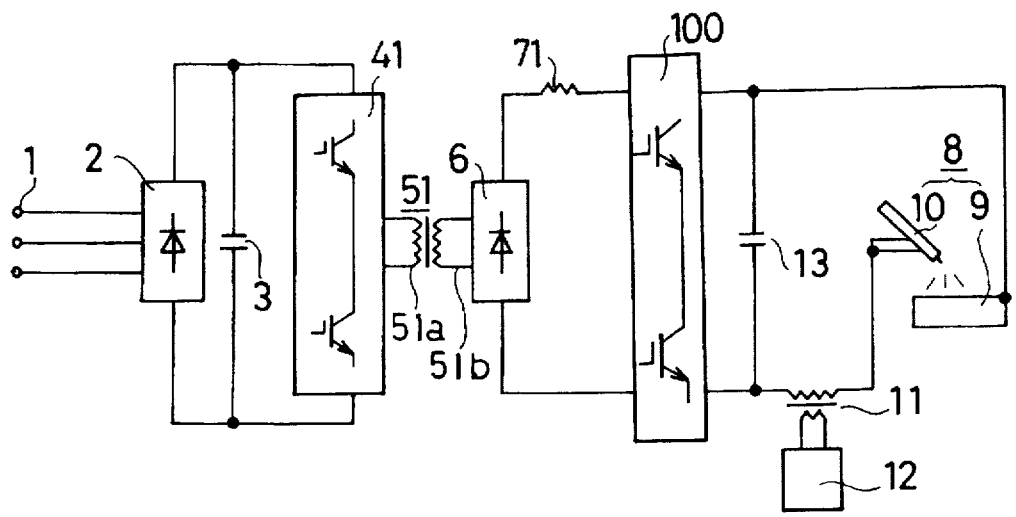
FIG. 5 is a block diagram of a non-consumable electrode AC arc welder according to still another embodiment of the present invention.

The present invention is also embodied in non-consumable electrode AC arc welders, such as the one shown in FIG. 5. In this case, a low frequency inverter 100 is added to convert the output DC voltage from the DC reactor 71 to a low frequency AC voltage having a frequency of from, for example, 50 Hz to 200 Hz. The output low frequency current from the low frequency inverter 100 is applied to the workpiece 9 and the main electrode 10 for establishing steady-state arcing between them.

Figure 6:
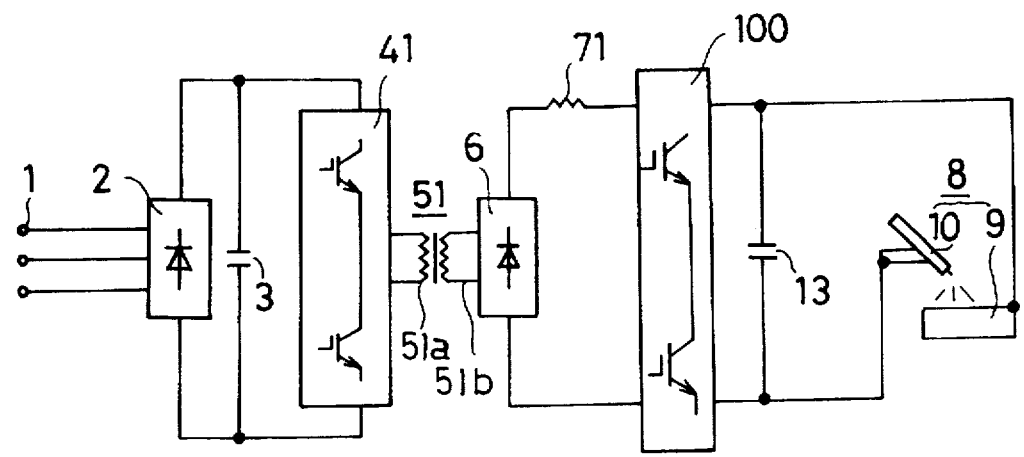
FIG. 6 is a block diagram of a consumable electrode AC arc welder according to a further embodiment of the present invention.

As shown in FIG. 6, the present invention is also applicable to a consumable electrode arc welder which includes the low frequency inverter 100, but does not include the coupling coil 11 and the RF generator 12.

What is claimed is:

1. An arc welder comprising:
    an inverter for converting a DC voltage to an AC voltage;
    a rectifier for rectifying the AC voltage from said inverter;
    a DC reactor for smoothing the rectified voltage from said rectifier; and
    an RF current supply circuit disposed in one of paths extending from outputs of said DC reactor to a workpiece and a main electrode, respectively, for supplying RF current to flow between said workpiece and said main electrode, said workpiece and said main electrode forming a welder load, the application of said RF current from said RF current supply circuit causing output current of said DC reactor to be applied to said welder load for establishing steady-state arcing between said workpiece and said main electrode;
    wherein the inductance of said reactor is from 3 to 2 µH, and the frequency of said AC voltage from said inverter is from 16 to 100 KHz.

2. The arc welder according to claim 1 further comprising a low frequency inverter disposed between outputs of said DC reactor and said welder load, for converting a voltage supplied thereto through said DC reactor to a low frequency voltage.

3. An arc welder comprising:

an inverter for converting a DC voltage to an AC voltage;

a rectifier for rectifying the AC voltage from said inverter; and a DC reactor for smoothing the rectified voltage from said rectifier, the output voltage of said DC reactor being applied between a workpiece and a main electrode which form a welder load;

arcing being initiated between said workpiece and said main electrode by bringing said workpiece and said main electrode into contact with each other, the initiation of arcing causing current from said DC reactor to be applied to said welder load for establishing steady-state arcing between said workpiece and said main electrode;

wherein the inductance of said reactor is from 3 to 20 μH, and the frequency of said AC voltage from said inverter is from 16 to 100 KHz.

4. The arc welder according to claim 3 further comprising a low frequency inverter disposed between the outputs of said DC reactor and said welder load, for converting a voltage supplied thereto through said DC reactor to a low frequency voltage.

* * * * *